Dec. 19, 1933.                    E. G. GAGE                    1,939,685
                RADIANT ENERGY DISTANCE DETERMINING SYSTEM
                Filed March 14, 1931        3 Sheets-Sheet 1
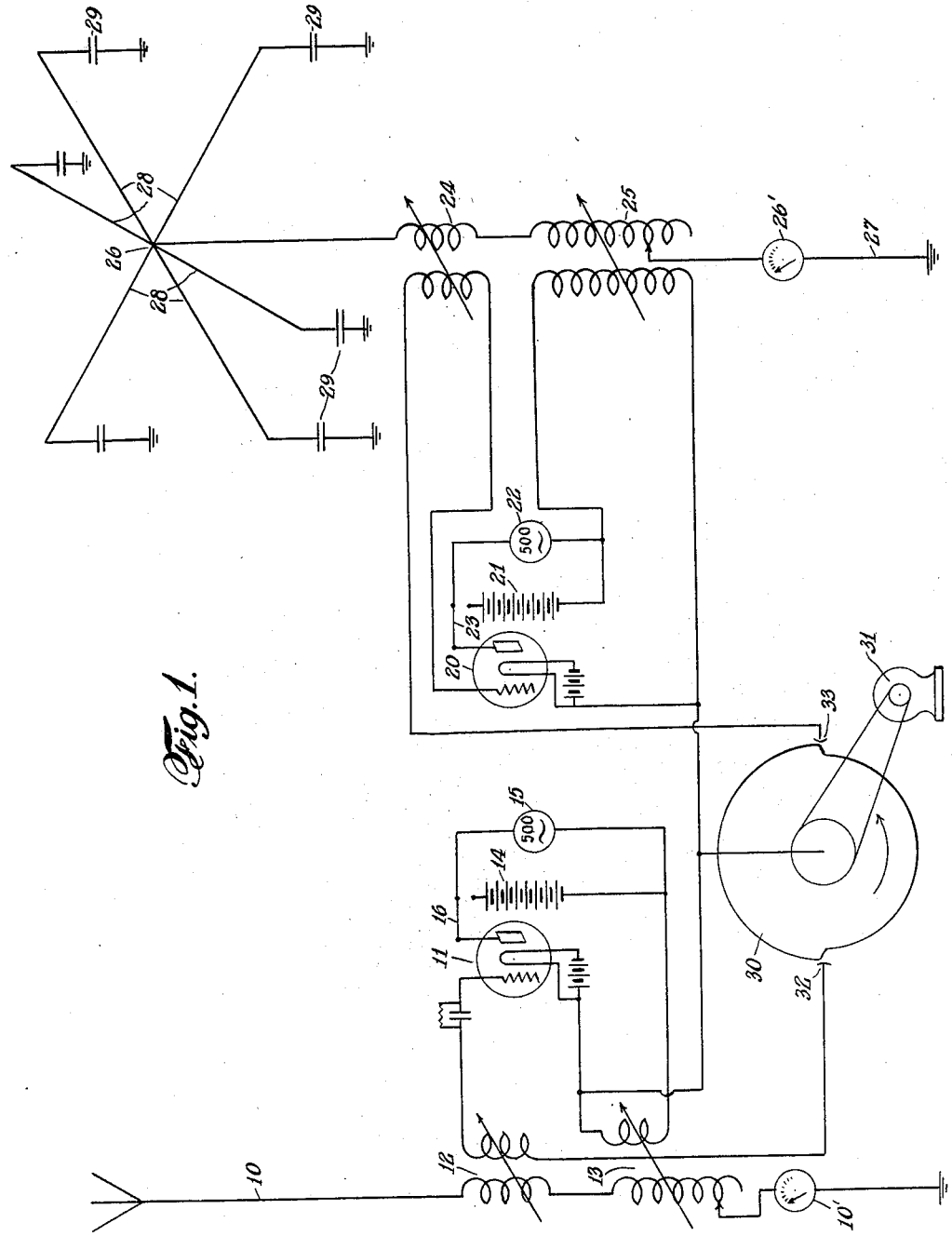
INVENTOR
EDWARD G. GAGE
BY
ATTORNEY

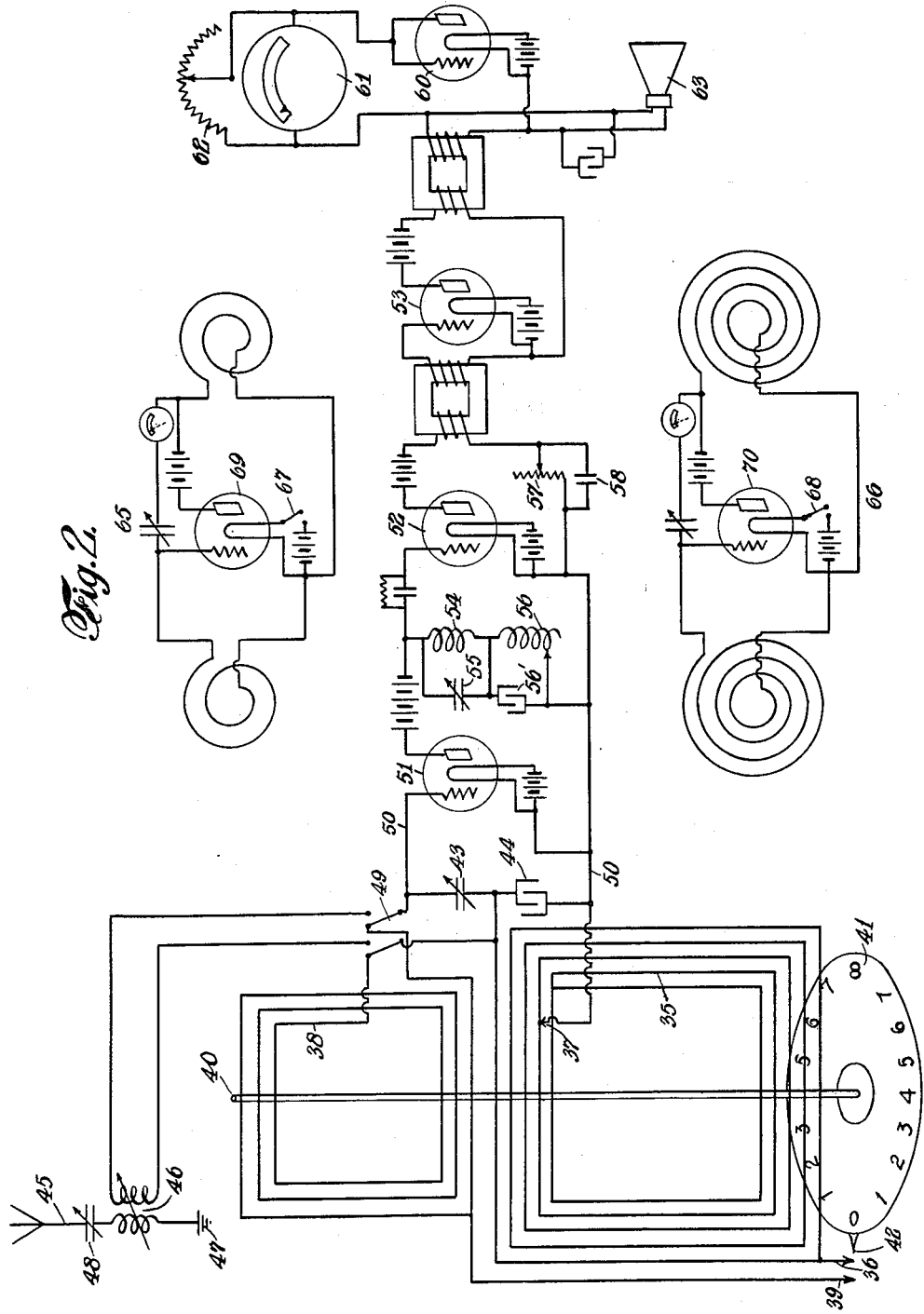

Dec. 19, 1933.　　　　　　　E. G. GAGE　　　　　　1,939,685
RADIANT ENERGY DISTANCE DETERMINING SYSTEM
Filed March 14, 1931　　　3 Sheets-Sheet 3
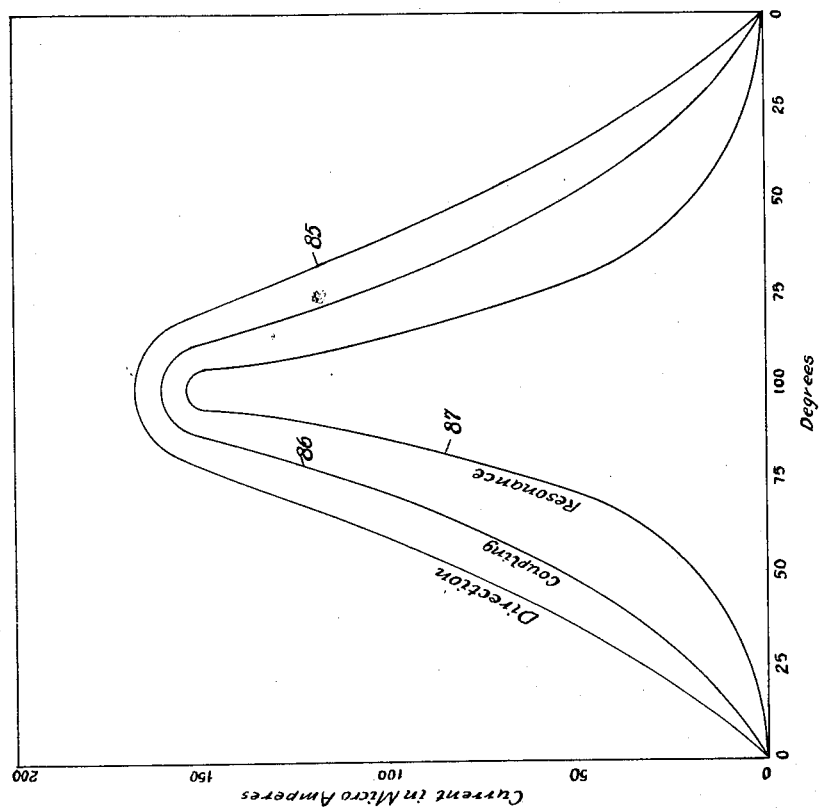
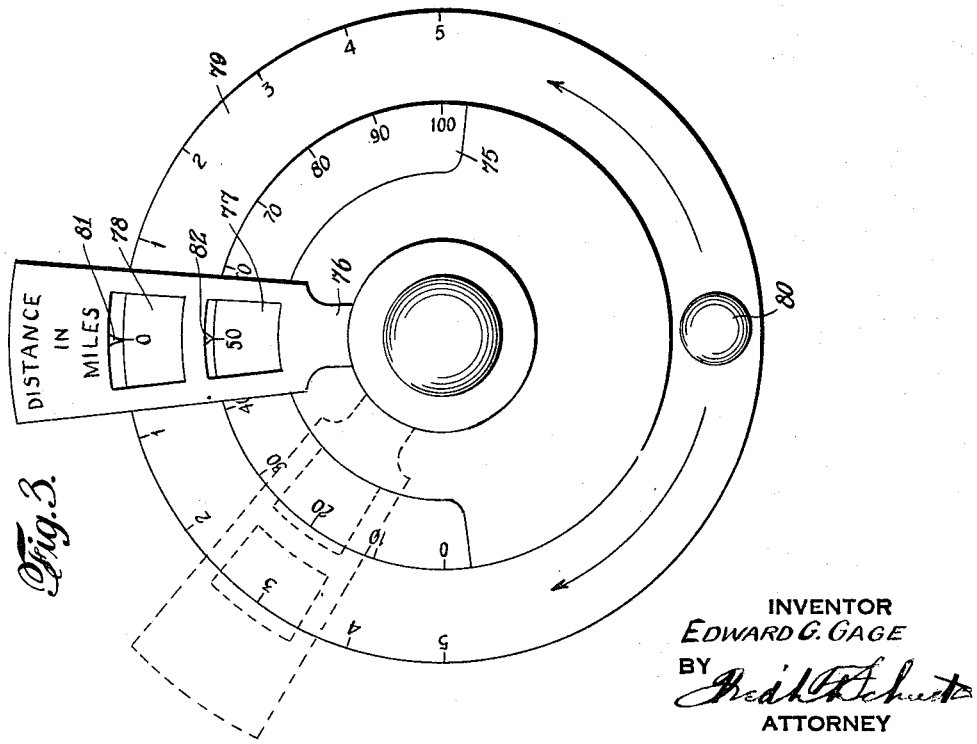
INVENTOR
EDWARD G. GAGE
BY
ATTORNEY Patented Dec. 19, 1933

1,939,685

UNITED STATES PATENT OFFICE 1,939,685

RADIANT ENERGY DISTANCE DETERMINING SYSTEM

Edward G. Gage, Brooklyn, N. Y., assignor of one-half to Leon Ottinger, New York, N. Y., and one-half to Electrical Industries Manufacturing Company, New York, N. Y., a corporation of New York Application March 14, 1931. Serial No. 522,727

7 Claims. (Cl. 250—2)

The invention relates to a radio transmission and reception system and to a novel combination of apparatus utilized therein; and more particularly to the determination of the distance between a radio transmitting station and a radio receiving station, one of which is movable relatively to the other.

In a corresponding application, Serial #483,802, I have disclosed a method and apparatus whereby such determination is effected by the transmission simultaneously of two signals, one of long wave length and high attenuation, and one of short wave length and low attenuation, said signals being received simultaneously on separate and independent receiving apparatus, and the difference in amplitude of the received signals then utilized as a measure of the distance.

The present invention has for an object the dual reception by a single receiver apparatus of a signal of high attenuation and long wave length and a signal of low attenuation and comparatively short wave length and transmitted alternately.

A further object of the invention resides in the provision of means for increasing the attenuation between the two received signals, and also in the provision of means for varying the amplitude of the one of the two received signals without varying the amplitude of the other signal.

A still further object of the invention is to effect an equalization between the received signals by drawing the received energy from different points on their resonance curves, the required dissonance of the one as compared with the resonance of the other serving as a measure of the distance; and an additional object of the invention resides in the provision of means for accomplishing the resonance adjustment of one of the signals without disturbing the resonance adjustment of the other.

The invention has for another object the reception of either modulated continuous waves or heterodyne signals, and the provision of means for equalizing the signals of low attenuation and the signals of high attenuation by variably coupling an auxiliary wave collector to the receiving circuit of the low attenuation signal independently of the reception of the high attenuation signal, the degree of coupling necessary to effect such equalization being a measure of the distance.

Another object of the invention resides in the combination of a radio compass and a distance finder embodying directional loops in which the deviation of one loop from the true direction, as shown by the other, for equalizing the amplitude of the two received signals serves both as a measure of distance and as a means of determining the direction.

Other and ancillary objects will hereinafter appear.

In the accompanying drawings which illustrate my invention, Fig. 1 is a diagrammatic layout of a transmitting circuit adapted for the alternate transmission of long wave, high attenuation signals and short wave, low attenuation signals.

Fig. 2 is a diagrammatic view illustrating the arrangement of a receiving system embodying my invention.

Fig. 3 is a plan view of a measuring instrument for reading directly distance.

Fig. 4 illustrates curves of direction, coupling and capacity for use in calibrating the measuring instrument illustrated in Fig. 3.

Referring to the drawings, 10 designates a conventional antenna of relatively good radiating properties and operating near its fundamental frequency. It is preferably of the vertically disposed type, and of low ohmic resistance and high radiation resistance for transmitting signals of low attenuation and on an intermediate wave band, for example, 800 meters.

An oscillator circuit embodying the oscillator tube 11 is coupled to the antenna through the variable grid coupling 12 and plate coupling 13, the oscillator being of relatively low power and energized either from the plate battery 14 or from a modulated source of alternating current 15, a change-over switch 16 being provided to cut in one or the other.

Fig. 1 illustrates also an additional oscillating circuit embodying the oscillator tube 20 of relatively high power and operating at comparatively low frequency or long wave, for example, 30,000 meters. The oscillator is energized from the battery 21 or modulated source of alternating current 22, the change from one to the other being effected by a switch 23. The latter oscillating circuit is coupled, as through the variable grid coupling 24 and plate coupling 25, with an antenna 26 grounded at 27. This antenna is of the order of a closed loop, having the arms or branches 28 extending radially outwardly from its upper end, said arms being individually grounded through corresponding series condensers 29. The latter are located at a distance from the ground comparable to the height of the antenna in order to form a closed type of loop or deformed antenna to produce signals of high attenuation, as more fully set forth in my aforesaid copending application, Serial No. 483,802.

To alternately transmit signals over the aforesaid antennæ, a rotatable switch device embodying the cam 30 is provided, the same being driven from a motor 31 and periodically closing alternately contacts 32 and 33, respectively.

The receiving circuit is indicated in Fig. 2 of the drawings and embodies a multi-turn directional loop 35 provided with a pointer element 36, and is adapted to be tapped at different points as at 37 for tuning to resonance in the case of signal of long wave and high attenuation.

A further loop 38 of a fixed number of turns, and having the pointer element 39, is also associated with the loop 35. Both of the said loops are rotatable about a fixed shaft 40, and at the bottom of the shaft is attached for rotation a scale element 41 having the pointer 42 adapted to cooperate with the pointer elements 36 and 39 of the loops. Pointer 42 is located at the zero point of the scale element which is provided with graduations upon opposite sides of said pointer indicating units of distance. Loop 38 is tuned by means of a short wave condenser 43, while a shunt condenser 44, preferably fixed, is connected with the loop 35 for the signal of long wave length.

The receiving system embodies, furthermore, an independent and auxiliary short wave antenna 45 which may be variably coupled to the receiving circuit, hereinafter described, by means of a variable coupling coil 46, said antenna being grounded at 47 and including also in series a variable condenser 48. The coupling coil 46 is to be equipped with the usual handle and scale for rotation by the former in the well known manner, and is shown in detail in Fig. 3 of the drawings and hereinafter more fully described. Similarly, the variable condenser 48 may be equipped with operating handle or knob and scale for adjustment purposes. The introduction of the antenna 45 to the receiving circuit may be accomplished by means of a switch 49 which at the same time throws out of circuit the loop 38.

The incoming circuit 50 from the various antennæ is connected with the radio frequency amplifying tube 51, which may be of the screen grid type, and detector tube 52 and the audiofrequency amplifying tube 53. A fixed impedance 54 with small shunted variable capacity 55 and a variable impedance 56, shunted by a large fixed condenser 56', may be connected across the output from the radio frequency tube 51, the condenser 55 being for the purpose of tuning the short wave radio frequency circuit to the detector independently of the adjustments for the long wave reception, which are effected by variable impedance 56.

A variable resistance 57, shunted by a condenser 58, is included in series with the output circuit from the detector for the purpose of varying the plate voltage of said circuit and consequently the gain of the following audiofrequency amplifying tube 53 to suit conditions.

The output of the amplifying tube 53 is connected through a rectifier, embodying the tube 60 with plate and grid strapped together, to a sensitive microammeter 61 provided with variable shunt 62 for adjustment of signal strength. A loudspeaker 63 is connected across the instrument circuit for affording an audible signal in conjunction with a visual signal.

There is also associated with the receiving apparatus hereinbefore described a short wave local heterodyne oscillator 65 and a similar oscillator 66 for long wave heterodyning, these oscillators being utilized in the reception of unmodulated continuous wave signals when such signals are transmitted from the antennæ 10 and 26, respectively. The respective oscillators are placed in action in the usual manner by the closing of a filament switch 67 and a filament switch 68 for their respective tubes 69 and 70; and as hereinbefore noted, switches 16 and 23 are provided for selecting either modulated or unmodulated transmission.

A convenient instrument for use with the coupling and resonance methods of reception is shown in detail in Fig. 3 of the drawings, and comprises a fixed dial portion 75 which is suitably calibrated for approximately two quadrants, and a movable arm 76 which is rotatably mounted centrally of said scale. Arm 76, furthermore, is provided with two radially disposed windows 77 and 78, the former being adapted to move over the scale 75 and the latter over a further circularly disposed scale 79 concentric with the scale 75.

The latter scale 79, however, is calibrated in opposite directions from a zero position, and, moreover, is circularly movable as by means of an operating knob 80 attached to its uncalibrated portion. The aforesaid calibrations of scale 79 are in units of distance, such as miles, and are visible through the window 78, both windows having marking points 81 and 82 respectively associated therewith and lying in a radius common thereto.

Reference being had to Fig. 4 of the drawings, the direction curve of receiving loop 35 is indicated at 85 and the coupling curve for the coupling coil 46 is indicated at 86, while 87 represents the resonance curve of the antenna condenser 48. Current in microamperes is represented by the ordinates while the abscissæ represent respectively degrees of direction, coupling and capacity.

In the practical operation of the hereinbefore described radiant energy distance determining system and apparatus, the transmission apparatus for radiation of both the long and short waves may be located near each other as on the same ground or within an airport, or, they may be widely separated and connected by a land wire, for example, in the manner more particularly set forth in a copending application filed by me of even date herewith.

Assuming, for example, that both radiating systems are located on the same grounds, as indicated in Fig. 1 of the drawings, the short wave oscillator 11 and the long wave oscillator 20 are respectively coupled to their radiating antennæ 10 and 26. The control motor 31 for effecting energization alternately of the said oscillators is then caused to revolve the disk 30 so as to close the contacts 32 and 33 alternately for energizing the short wave antenna and the long wave antenna. This latter antenna, as hereinbefore described, is preferably a combination of loop and open antenna, although a simple antenna or a simple loop may be used if desired, precautions being taken in the latter event for directing its radiations.

In the deformed type of antenna 26 embodying the radiating arms 28 and condensers 29 interposed between the same and the ground, the capacity of each of these condensers is such that a definite proportion of the energy is passed therethrough to the ground, thus forming a closed loop of each branch or arm. In view of the distribution of these loops about the upright portion of the antenna, the entire structure becomes non-directional and radiates electromagnetic waves approximately equally in all directions, the amount of the energy radiated depending upon the capacity of the condensers 29 for attenuating to the desired extent the radiated signal. For example, if the condensers 29 are of very large capacity, say of the order of magnitude of 1 mfd., totalling in the case of the six branches shown 6 mfds. in series with the main upright portion of the antenna and ground, the structure will then operate similarly to loops in parallel and depend for radiation attenuation on the area enclosed.

On the other hand, if the condensers in series with each branch be of the order of .001 mfd. and making a total for the six branches of .006 mfd. in series with the upright portion of the antenna and ground, the structure will then radiate more nearly like an open antenna and the attenuation will depend on the height of the structure.

A combination may be chosen by trial which will give the desired attenuation for a limited range; and having ascertained this, the capacity 29 is fixed. When the energizing source is then coupled to the antenna 26, as through the coupling 25, electromagnetic waves of relatively high attenuation constant will be radiated from said antenna when the rotating disk 30 engages with the contact 33.

As said disk 30 continues to rotate, it opens the energizing circuit of antenna 26 and immediately closes, at contact 32, the energizing circuit of antenna 10 and the length of the signal radiated depends on the speed of said disk. It is desirable that the no-contact interval be as short as possible to avoid large movement of the needle of receiver instrument 61 when changing over from one antenna to the other.

By means of the respective switches 16 and 23, the radiated signals may be changed from modulated continuous waves to unmodulated waves, but in the operation of the system both oscillators should send out the same kind of wave. Assuming that both oscillators are transmitting with modulated continuous waves, the energy of each is maintained constant by a reference to the radio frequency meters 10' and 26' included in the respective antenna circuits of antennæ 10 and 26, for example, by suitably changing the coupling at 13 and 25.

The proportion of power assigned to each oscillator depends upon the desired range of the particular station and where the limit of range for the short wave radiated signal is required to be, for example, 50 miles, the primary power may approximate 50 watts. Where the limit of range for the long wave is required to be approximately 5 miles, the primary power required will be substantially 5 kilowatts. In this connection, it is always desirable that the radiated signals of short wave have a longer range than the signals of longer wave in order that the former may be picked up first and serve as a guide in ascertaining the direction of the weaker or long wave signal.

In taking a distance reading by the directional method, utilizing the loop antennæ 35 and 38, the method of procedure is as follows:

With the transmitter working as hereinbefore described, switch 49 is thrown to connect in the short wave receiving loop 38. The receiver apparatus, which may, for example, be located on an airplane, is then tuned first to the short wave and the direction of the transmitting station determined by rotating in the usual manner a short-wave loop, until maximum deflection of meter needle is obtained on the instrument 61. The airplane or other carrying medium of the receiver apparatus is then headed toward the transmitting station.

When the short wave signal is first picked up on the loudspeaker 63, or on head phones (not shown), the needle of instrument 61 will show no deflection, indicating that the airplane is beyond the range of the transmitter for the long wave signals. However, as the signals of shorter wave become stronger, due to the approach of the airplane to the transmitting station, the needle of the measuring instrument will show a slight movement toward the middle of its scale, and when maximum needle movement is attained (approximately the middle of the scale of instrument 61) the long wave signal has become audible in the loudspeaker 63 and is tuned by tapping its loop at the connection 37 to maximum response and at which the instrument needle will show a slight movement. Loop 35 is then swung to position for maximum deflection of needle and will lie in plane of loop 38. The marking zero pointer 42 of the distance scale of dial 41 is then adjusted, by moving said dial, until it registers with the long wave loop pointer 36. Thereupon, the shorter loop pointer 39 is rotated by swinging loop 38 out of the true direction until the reading of the needle of instrument 61 is the same as that produced by the long wave signal on said instrument.

The position of the short wave loop pointer 39 with respect to the long wave loop pointer 36 is then indicated by the figures on the scale of the dial and the angular amount which the pointer 39 has been displaced with reference to the zero pointer 42 indicates the distance of the receiving station from the transmitting station, said distance being readable on the dial from the scale thereon, for example, in miles.

To take a distance reading by the coupling method, switch 49 is thrown to introduce the auxiliary antenna 45 with variable coupling coil 46, cutting out at the same time the receiver loop 38. In this measurement the determination of direction of the transmitting station as previously practiced in the case of the short wave loop 38 is optional, as the antenna 45 picks up signals equally well from all directions. The long wave loop 35, however, must be pointed in line with the transmitter station for maximum needle deflection, unless there be substituted for the loop 35 an open circuit antenna similar to the antenna 45 and which may be utilized, if desired.

Having obtained the maximum needle deflection for the long wave both by tuning and by suitably directing said loop 35 and likewise having obtained a maximum deflection for the short wave signal by use of the tuning condenser 48 associated with antenna 45, the adjustable coupling 46 is manipulated to obtain optimum coupling of said coil, as by turning the knob 76, the same being indicated by maximum deflection of the needle of instrument 61. When this position has been located, the movable scale 79 is rotated about the fixed scale 75 by manipulating knob 80 until the zero of said scale is under the window 78 and registering with the marker 81. Scale 79 is then maintained in this position while the arm 76 is moved to one side or the other of the optimum coupling position as indicated by the scale 79.

It is to be noted that the adjustment is best taken on the same side, although the coupling curve being symmetrical the error will not be great if the same side is not always chosen. Scale 79, therefore, is provided with figures on both sides of the zero so that a quick approximate reading is always available without the necessity of making a decision as to which side of the optimum position to take readings. The figure on scale 79 which then appears under the window 78 indicates the distance in miles, or units of distance.

The scale 75 and its corresponding window 77 and the marker 82 may be dispensed with, if it be found desirable to simplify the apparatus. It serves, however, as a convenient marker for the optimum coupling position, and its use is to be recommended. The variable shunt 62 across the measuring instrument 61 is utilized to bring the short wave strong signals within the range of the instrument, in manner well understood.

The procedure for taking readings by means of resonance or capacity method is practically the same as that described for the coupling method, the variable condenser 48 being provided with a calibrated operating handle as indicated in Fig. 3 and utilized similarly to the adjustment of coupling 46, the only difference being in the calibration of the scale. A maximum needle deflection of the instrument 61 is obtained for the long wave signals by means of directing the loop 35 and tuning of the same by adjusting top 37, and a maximum deflection for the short wave signal by adjusting condenser 43 and the coupling 46 and condenser 48.

This adjustment of both long and short wave circuits when they are connected to the same grid circuit, does not interfere with their independent adjustment and consequently one does not become detuned by a change in the other for the following reason.

Condenser 43 is very small compared to condenser 44. Condenser 43, being in shunt with loop 38 or coil 46 is sufficiently large to tune to short wave signals, but is too small to make any appreciable difference in the period of loop 35, which already has a very much larger capacity 44 in shunt with it.

In the same manner, changing the inductance of loop 35 does not materially influence the short wave loop or antennæ circuit because this inductance is already by-passed for high frequency or short wave signals by the very large fixed condenser 44.

The window 77 of the arm 76, as the condenser 48 is adjusted, serves to indicate the point of resonance on scale 75; and when this has been found, the scale 79 is moved by knob 80 until the zero of said scale is under the window 78, or opposite the figure on the scale 75 which is under window 77. The condenser 48 is then detuned by moving the arm 76 until the needle deflections of instrument 61 are the same both for the long and short waves received. Window 78 will then be over the figure on scale 79 which indicates the distance in miles or other unit of distance.

The resonance curve is likely to be unsymmetrical and for this reason it is best to adhere to one side or the other of the resonance curve in taking measurements, this side depending on the particular one used in the original calibration.

It is to be understood that in all the foregoing three methods, namely: direction, coupling and resonance, the procedure of determining distance has been previously carried out and the results calibrated on the scales as shown. Each method may be used as a check on the other two.

The taking of readings when unmodulated continuous waves are transmitted, is the same as with modulated waves except that in the former instance the local oscillators 65 and 66 are rendered active by closing their filament battery switches 67 and 68, respectively. The local oscillators are then detuned from the signal sufficiently to produce the desired audio frequency, usually approximately 700 cycles. These local oscillators, as in all receivers of heterodyned signals, should be located at a predetermined and fixed distance from their respective receiving loops in order to provide for optimum heterodyne values, as is well understood. The selected positions, as well as all electrical values of the oscillators, must be maintained constant during and after calibration.

The entire receiving apparatus, exclusive of the auxiliary antenna, may be located in a convenient cabinet suitable for use on an airplane, dirigible, ship, submarine, or the like, and may serve both as a distance and direction finder.

I claim:

1. In a system of the character set forth: a pair of transmitting antennæ adapted for electromagnetic waves of different frequencies, and having different radiating powers, means to radiate alternately the waves of different power characteristics, a dual-tuned receiving circuit, instrumentalities subject to the effect of the different received waves, means to adjust the effects on said instrumentalities, and means to measure the amount of adjustment required as a measure of the distance sought.

2. In a system of the character set forth: a pair of transmitting antennæ adapted for electromagnetic waves of different frequencies, and having different radiating powers, means to radiate alternately the waves of different power characteristics, a dual-tuned receiving circuit including a pair of receiving antennæ connected thereto and with characteristics corresponding to the respective transmitted waves, instrumentalities subject to the effect of the different received waves, means to adjust the effects on said instrumentalities, and means to measure the amount of adjustment required as a measure of the distance sought.

3. In a system of the character set forth: a pair of transmitting antennæ adapted for electromagnetic waves of different frequencies, and having different radiating powers, means to radiate alternately the waves of different power characteristics, a dual-tuned receiving circuit including a pair of loop antennæ connected thereto and having characteristics corresponding to the respective transmitted waves, means to adjust the respective antennæ to equalize their respective responses, and means to measure the amount of adjustment required as a measure of the distance sought.

4. In a system of the character set forth: a pair of transmitting antennæ adapted for electromagnetic waves of different frequencies, and having different radiating powers, means to radiate alternately the waves of different power characteristics, a dual-tuned receiving circuit including a pair of antennæ one of which is of the directional and the other of the non-directional type, means to obtain maximum response by the former, means to adjust the other of the antennæ to equal the maximum response of the directional antenna, and means to measure the amount of adjustment required as a measure of the distance sought.

5. In a system of the character set forth: a pair of transmitting antennæ adapted for electromagnetic waves of different frequencies, and having different radiating powers, means to radiate alternately the waves of different power characteristics, a dual-tuned receiving circuit including a pair of antennæ one of which is of the directional and the other of the non-directional type, means to obtain maximum response by the former, a variable capacity in the circuit of the other antenna, means to vary said capacity to equal the maximum response of the directional antenna, and means to measure the amount of adjustment required as a measure of the distance sought.

6. In a system of the character set forth: a pair of transmitting antennæ adapted for electromagnetic waves of different frequencies, and having different radiating powers, means to radiate alternately the waves of different power characteristics, a dual-tuned receiving circuit including a pair of antennæ one of which is of the directional and the other of the non-directional type, means to obtain maximum response by the former, a variable coupling associated with the other antenna, means to vary said coupling to equal the maximum response of the directional antenna, and means to measure the amount of adjustment required as a measure of the distance sought.

7. In a system of the character set forth: a pair of transmitting antennæ adapted for electromagnetic waves of different frequencies, and having different radiating powers, means to radiate alternately the waves of different power characteristics, a dual-tuned receiving circuit including a pair of antennæ one of which is of the directional and the other of the non-directional type, means to obtain a predetermined response by the former, means to adjust the other of the antennæ to equal the predetermined response of the directional antenna, and means to measure the amount of adjustment required as a measure of the distance sought.

EDWARD G. GAGE.